Nov. 1, 1955     M. STIMLER     2,722,056
TILT INDICATOR

Filed Jan. 16, 1953     2 Sheets-Sheet 1

INVENTOR
MORTON STIMLER

BY

ATTORNEYS

Nov. 1, 1955

M. STIMLER 2,722,056

TILT INDICATOR

Filed Jan. 16, 1953

INVENTOR
MORTON STIMLER

BY
*J. D. O'Brien*
*R. M. Hicks*
ATTORNEYS

United States Patent Office 2,722,056
Patented Nov. 1, 1955

2,722,056

TILT INDICATOR

Morton Stimler, Silver Spring, Md.

Application January 16, 1953, Serial No. 331,752

7 Claims. (Cl. 33—206)

(Granted under Title 35, U. S. Code (1952), sec. 266)

The invention described herein may be manufactured and used by or for the Government of the United States of America for governmental purposes without the payment of any royalties thereon or therefor.

This invention relates to a tilt indicator and more particularly to a device for indicating the degree of tilt of the casing within which the presently disclosed apparatus is housed.

Heretofore, level indicators have been designed which comprise weights freely suspended from a pendulum which is mounted on a shaft extending from the slider contact of a potentiometer. The potentiometer housing is fixed to an outer case which undergoes the rotation or tilt to be measured. When the casing is tilted the slider contact on the pendulum shaft moves relative to the winding of the potentiometer whereby a variation in the output voltage is created. This output voltage is correlative of the degree of tilt of the casing. The disadvantages inherent in this system are that the device is insensitive in that the weight on the pendulum must be displaced sufficiently to create a countertorque to overcome the friction of the potentiometer. The sensitivity of such a device cannot be increased by increasing the mass of the pendulum weight since this creates a greater thrust on the bearings of the potentiometer.

The present invention overcomes these disadvantages by providing a mechanism for measuring the degree of tilt which does not require any special bearings to adapt it for use with a potentiometer. There is provided a casing having a potentiometer fixedly mounted thereon. The shaft extending from the slider contact of the potentiometer has fixedly secured thereto a pair of arms extending outwardly normal to the shaft. On the end of each arm is mounted a tapered float. The casing is partially filled with a liquid to such a point that the buoyant force of the liquid acting on the floats overcomes the weight of the arms and floats so that there is no increased thrust load on the bearings of the potentiometer. As the casing is tilted the liquid and float assembly remain in the same position relative to the earth whereby slider contact of the potentiometer moves with respect to the winding. A recording apparatus is provided which records the output voltage produced thereby and this output voltage is correlative to the angle of tilt of the casing. The floats are so shaped that when the casing is tilted an unequal exchange of immersed volume is created such that there is a tendency for the fluid level to rise whereby a greater countertorque is produced overcoming the frictional resistance of the potentiometer. The mechanism herein disclosed is highly sensitive and is capable of recording small deviations of a frequency in the order of ten cycles per second.

An object of the present invention is to provide a device for indicating degrees of tilt in which the slider contact of a potentiometer moves relative to the fixed winding to vary the output voltage thereof in response to variation in the angle of tilt of the device.

A further object of this invention is to provide a tilt indicator in which a pair of floats is connected with the slider contact of a potentiometer, the floats being so shaped that a greater countertorque is created when the device is tilted whereby the frictional resistance of the potentiometer is overcome.

Other objects and many of the attendant advantages of this invention will be readily appreciated as the same becomes better understood by reference to the following detailed description when considered in connection with the accompanying drawings wherein.

Figure 1:
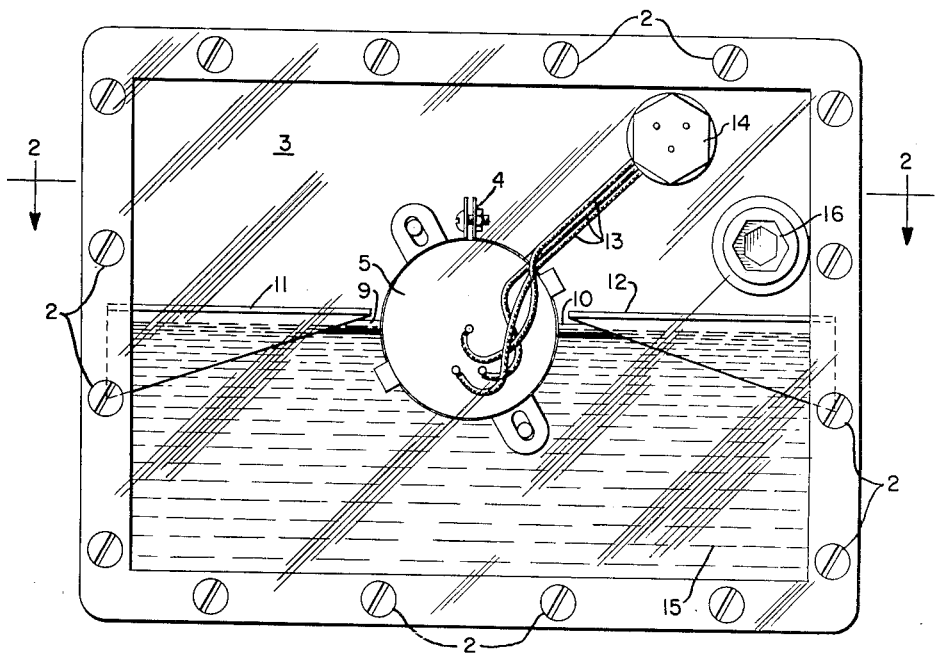
Fig. 1 is an elevational view of one embodiment of the present invention.
Figure 2:
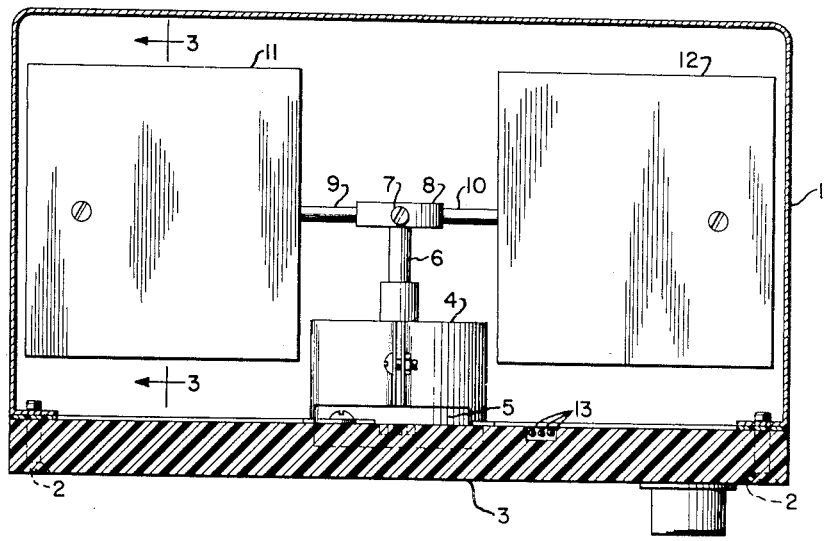
Fig. 2 is a sectional view along the line 2—2 of Fig. 1.
Figure 3:
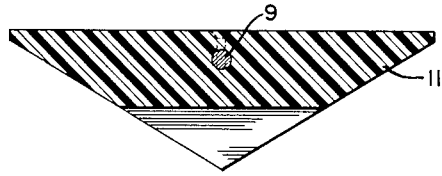
Fig. 3 is a sectional view of one float along the line 3—3 of Fig. 2.

Referring now to the drawings and more particularly to Figs. 1 and 2, there is shown at 1 a casing which has secured thereto as by means of screws 2 a transparent face plate 3. Suitably secured to the inner surface of this face plate as by means of an adjustable bracket 4 is a potentiometer 5 which may be of any well known variety having a fixed winding and a slidable contact member. The slidable contact is attached to a shaft 6 extending outwardly from the potentiometer housing. Secured to the outer end of shaft 6 by means of set screw 7 is a collar 8. This collar has bores disposed therein whereby arms 9 and 10 may be press-fitted therein. Arms 9 and 10 have mounted thereon float members 11 and 12 respectively which are of the tapered shape shown in Fig. 3. The potentiometer is provided with leads 13 extending therefrom to a connector plug 14 which is mounted in the face plate 3. The casing 1 is partially filled with a liquid 15 by opening the filler plug 16 which is disposed in an aperture in the face plate 3.

The liquid 15 is a non-conducting silicone oil having a viscosity sufficient to prevent undue oscillation when the casing is tilted. Sufficient liquid is inserted in the casing so that a buoyant force is supplied to the floats which overcomes the weight of the floats and shaft assembly such that there is no added bearing thrust on the shaft of the potentiometer. The tapered or inverted pyramidal shape of the floats with the vertexes thereof extending downwardly is specifically designed to overcome the inertia of the system and the frictional forces in the potentiometer thus increasing the sensitivity so that minute angles of tilt may be recorded. This is accomplished in that when the casing is tilted from the horizontal position one float tends to depress and by reason of the taper thereof to displace a greater volume of fluid and the other float tends to rise and by reason of the taper thereof to displace a proportionately less volume of fluid whereby an unequal exchange of immersed volume is created tending to cause the fluid level to rise which increases the buoyant force supplied by the depressed float which will assist in overcoming the inertia of the system and the friction of the potentiometer to quickly restore the floats to an even state of submersion. In addition the underside of the tapered floats acts paddle-like against the surface tension and viscosity of the fluid thus aiding the buoyant forces in overcoming the system inertia and potentiometer friction.

Figure 5:
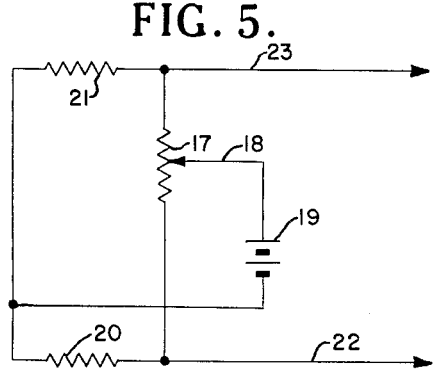
Fig. 5 is a wiring diagram of the present invention.

The wiring diagram is shown in Fig. 5. It can be seen that the potentiometer is provided with a fixed winding 17 having a slidable contact 18 disposed thereon. This slidable contact is suitably connected with shaft 6. There is thus provided a bridge circuit which includes portions of potentiometer 17 as one pair of bridge legs, a source of electrical energy indicated for purposes of illustration at 19 as a battery and connected to the junction of a pair of resistors 20 and 21 which comprise the fixed legs of the bridge. Leads 22 and 23 are connected to an electrical indicating instrument which serves to record the output of the potentiometer. The connector plug 14 (Fig. 1) serves to connect the electrical indicating instrument and source with the potentiometer 5. It can be seen that by virtue of the apparatus provided herein any variation in the angle of tilt of the casing will cause a corresponding variation in the output voltage of the potentiometer. In this manner an effective means is provided for measuring the degree of tilt of any object, such as a mine or torpedo, in which the present mechanism is disposed. It is further apparent that when two of the tilt indicators herein disclosed are disposed normal to one another variations in both pitch and roll will be recorded.

Figure 4:
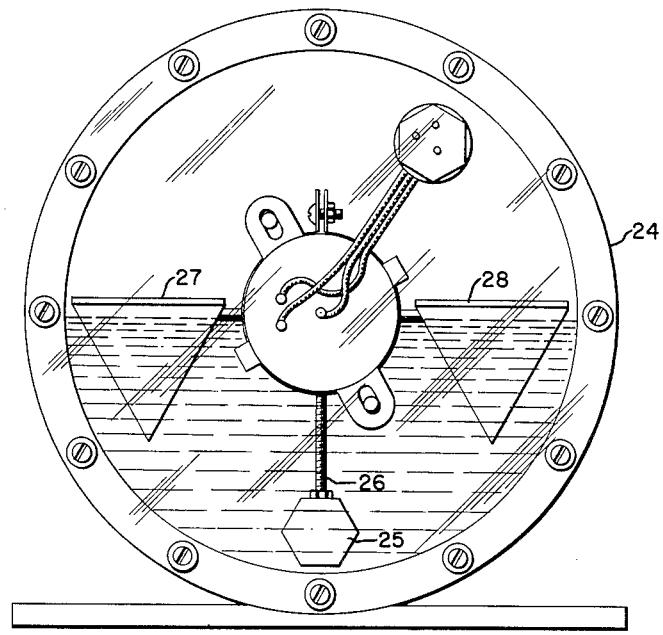
Fig. 4 is an elevational view of another embodiment of the tilt indicator herein disclosed.

In Fig. 4 is disclosed a modification of the present apparatus in which the casing 24 is circular in form whereby the tilt indicator is capable of recording a complete revolution of the casing so that the device may be employed as a revolution counter. In this embodiment the float assembly is provided with a counter-weight 25 mounted on shaft 26 which is secured to the collar member to which the floats are secured. Since it is desirable to maintain the liquid level at approximately the center of the potentiometer, the counterweight serves to offset the buoyant force of the liquid on the floats so as to prevent any bearing thrust on the potentiometer. The floats 27 and 28 are of conical or pyramidal shape but serve to produce the increased countertorque to assist in overcoming the frictional forces hereinbefore referred to. In all other respects this embodiment is similar to the embodiment shown in Figures 1–3 and employs the same electrical circuit as shown in Fig. 5.

Obviously many modifications and variations of the present invention are possible in the light of the above teachings. For example, the potentiometer may be replaced with any suitable device for indicating relative movement between the float shaft and the casing. Furthermore it is apparent that by increasing the length of the float arms the sensitivity of the device can be increased. It is therefore to be understood that within the scope of the appended claims the invention may be practiced otherwise than as specifically described.

What is claimed as new and desired to be secured by Letters Patent is:

1. In a tilt indicator, a casing, a shaft rotatably mounted within said casing, a pair of inverted pyramidal shaped floats, means mounting said floats on said shaft, the casing being adapted to be partially filled with a liquid to support said floats whereby when the casing is tilted the floats and shaft are rotated with respect to the casing, and means driven by said shaft for measuring the degree of rotation of said shaft.

2. In a tilt responsive device of the character disclosed, a casing, a fixed winding of a potentiometer secured to said casing, a contact in engagement with said winding and rotatable thereover, a shaft secured to said contact and extending inwardly in said casing, a pair of inverted pyramidal shaped floats, and means mounting said floats in diametrically opposed relation on said shaft, the casing being adapted to be partially filled with liquid to the point when sufficient buoyant force is supplied to the floats to overcome the weight of the floats and the supporting means whereby friction on the shaft is relieved when the casing is tilted and the contact moves over the fixed winding.

3. In a device of the character disclosed, a casing, a potentiometer mounted on said casing, the potentiometer having a movable element, inverted pyramidal shaped float means, means for mounting said float means whereby the same is operatively connected with the movable element of the potentiometer, said casing adapted to be partially filled with liquid whereby said float means is maintained at the level of the liquid when the casing is tilted and the position of the movable element of the potentiometer is altered.

4. A tilt responsive device comprising, in combination, a casing, a potentiometer mounted on said casing, the potentiometer having a movable element, a pair of inverted pyramidal shaped floats, mounting means for operatively connecting said floats with the movable element of the potentiometer, said casing being adapted to be filled with liquid to a point where said floats are partially immersed with said floats displacing a weight of liquid equal to the weight of said floats and said mounting means, a source of electrical energy connected to said potentiometer, and means for measuring variation of the output voltage of the potentiometer caused by tilting of the casing.

5. A device for indicating an angle of tilt comprising, in combination, a leak proof casing, a potentiometer mounted in said casing, said potentiometer having a movable contact element, a pair of floats, each of said floats being tapered downwardly to a vertex, mounting means for operatively connecting said floats to the movable contact element of the potentiometer, said floats being so mounted that the vertexes thereof extend downwardly, said casing being partially filled with liquid to partially submerge said floats whereby the weight of liquid displaced equals the weight of the floats and mounting means, a source of electrical energy connected to said potentiometer, and means for measuring variations in the output voltage of said potentiometer caused by tilting said casing.

6. In a tilt indicator of the type disclosed, a housing, a shaft, means rotatably mounting said shaft within said housing, a collar mounted on the outer end of said shaft, a pair of arms mounted in said collar and extending outwardly therefrom normal to said shaft, a pair of floats, one float being mounted on the outer end of each arm, said floats being of inverted pyramidal shape, the housing being adapted to be partially filled with a relatively viscous liquid whereby the floats are partially submerged, tilting of the housing initially causing an unequal exchange of immersed volume of said floats whereby a countertorque is created overcoming the frictional resistance of the shaft mounting means so that said shaft is rotated with respect to the housing, and means to measure the degree of rotation of the shaft.

7. A tilt responsive device of the character disclosed comprising, in combination, a potentiometer having a resistor and a contact element movable thereover, a shaft secured to said contact element, and rotatable therewith a housing, said potentiometer being secured to said housing, a float assembly mounted on said shaft, said float assembly including a pair of diametrically opposed floats of inverted pyramidal shapes, said housing being adapted to be partially filled with a relatively viscous liquid whereby the floats are partially submerged, tilting of the housing causing an initial turning moment on the float assembly whereby frictional resistance of the potentiometer is overcome, a source of electrical energy connected to said potentiometer, and a measuring device for indicating variation in the voltage output of said potentiometer caused by tilting of the housing.

References Cited in the file of this patent

UNITED STATES PATENTS

| | | |
|---|---|---|
| 1,552,691 | Girvin | Sept. 8, 1925 |
| 2,198,523 | Adams | Apr. 23, 1940 |